H. F. LANFERMAN.
RAKE.
APPLICATION FILED APR. 10, 1918.
1,283,816.
Patented Nov. 5, 1918.
2 SHEETS—SHEET 1.
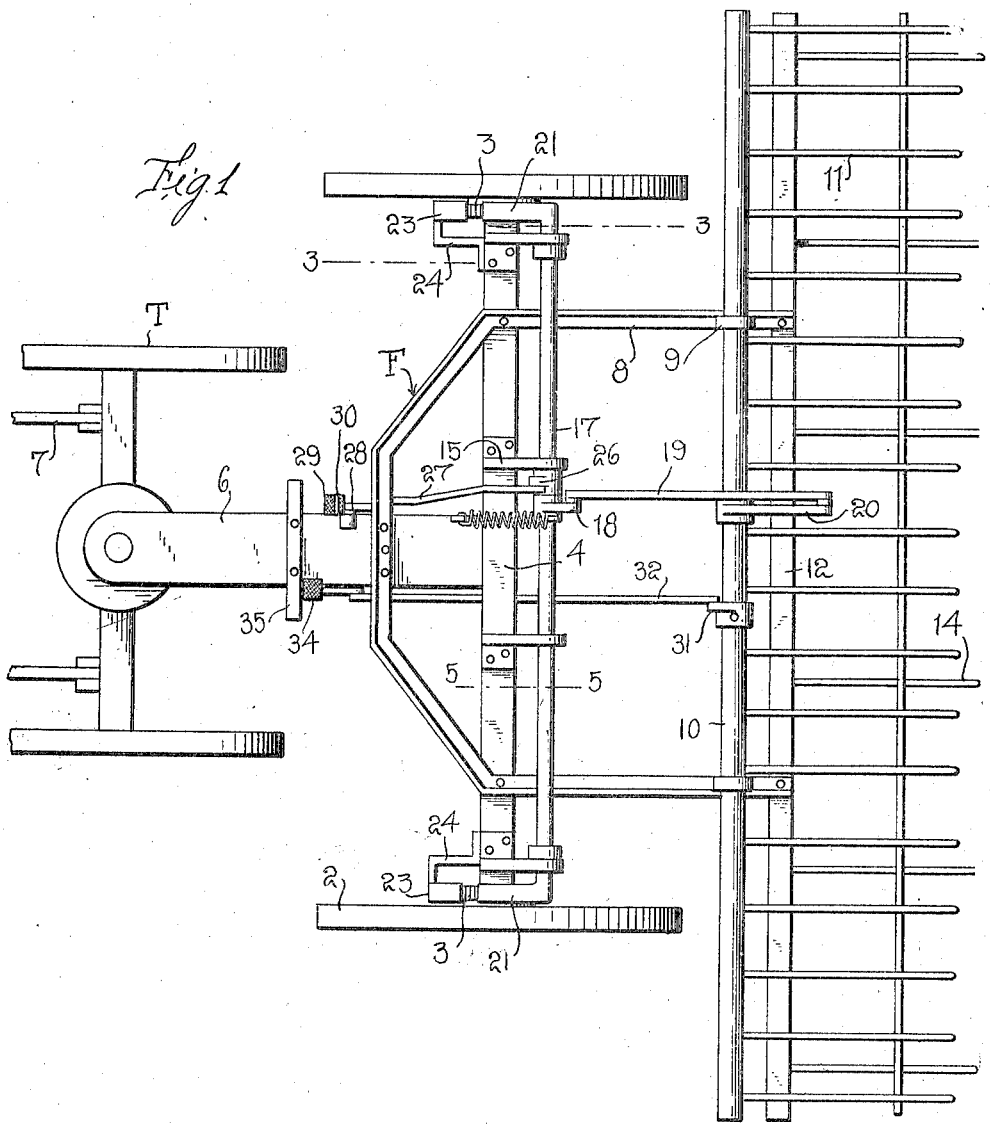
Inventor
Harry F. Lanferman
By Watson E. Coleman
Attorney

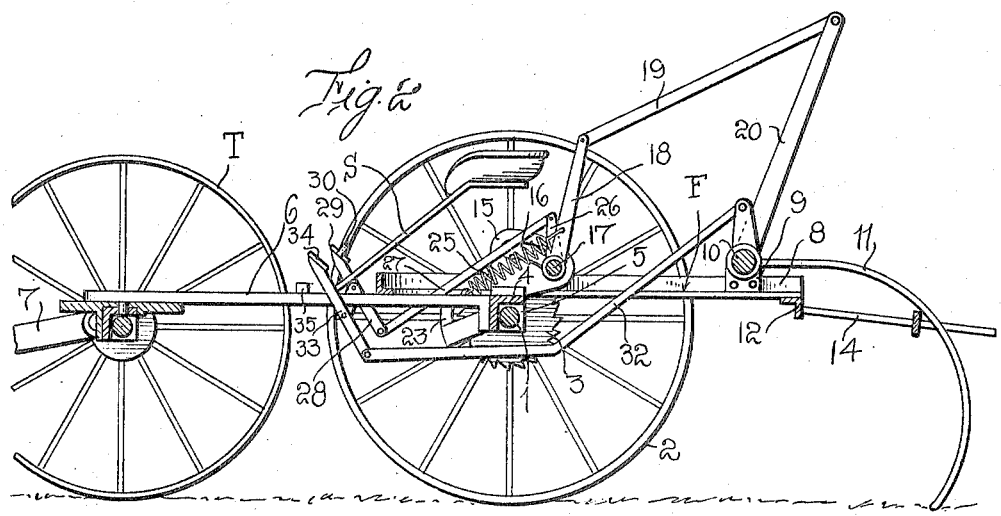
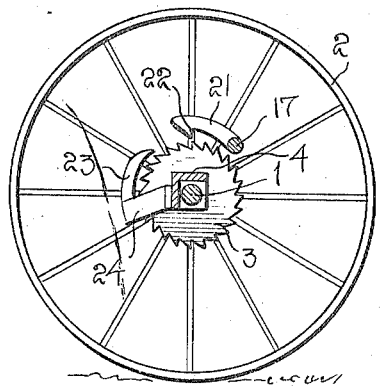
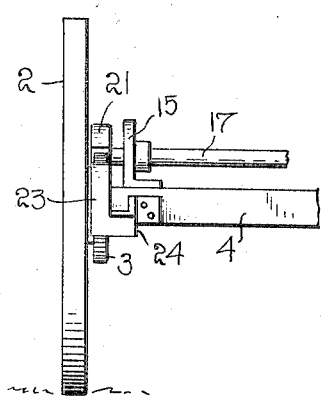
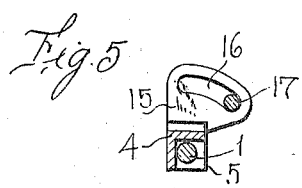

UNITED STATES PATENT OFFICE.

HARRY F. LANFERMAN, OF RADERSBURG, MONTANA.

RAKE.

1,283,816.   Specification of Letters Patent.   Patented Nov. 5, 1918.

Application filed April 10, 1918.   Serial No. 227,768.

*To all whom it may concern:*

Be it known that I, HARRY F. LANFERMAN, a citizen of the United States, residing at Radersburg, in the county of Broadwater and State of Montana, have invented certain new and useful Improvements in Rakes, of which the following is a specification, reference being had to the accompanying drawings.

This invention relates to certain improvements in rakes and has relation more particularly to a device of this type particularly designed and adapted for use in the collection of hay and it is an object of the invention to provide a novel and improved rake of this character which can be employed with convenience and facility and which effectively collects hay, especially when in close proximity to a fence, irrigating ditches or the like.

It is also an object of the invention to provide a novel and improved rake which is wheel-supported and which includes means whereby the tines of the rake may be thrown or raised into dumping position through the medium of a driven element whereby the operator is relieved of such labor as is generally required in rakes of this character.

Another object of the invention is to provide a novel and improved rake of this character which is adapted to be drawn by horses and wherein a structure is provided which materially relieves the draft animal or animals from the weight of the device and whereby the operator or driver is so positioned upon the machine to be free from injury by a draft animal in the event such animal should become unruly.

The invention consists in the details of construction and in the combination and arrangement of the several parts of my improved rake whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in top plan of a hay rake constructed in accordance with an embodiment of my invention, with the seat structure omitted;

Fig. 2 is a view in longitudinal section taken through my improved device as illustrated in Fig. 1;

Fig. 3 is a sectional view taken substantially on the line 3—3 of Fig. 1;

Fig. 4 is a fragmentary view in front elevation illustrating a portion of the means for throwing the rake proper into dumping position; and Fig. 5 is a sectional view taken substantially on the line 5—5 of Fig. 1.

As disclosed in the accompanying drawings 1 denotes an axle having fixed to the opposite end portions thereof the traction wheels 2. Also fixed to the shaft 1 inwardly of the wheels 2 or in close proximity to such wheels are the ratchet wheels 3 for a purpose to be hereinafter more particularly referred to.

4 denotes an angle iron arranged between the ratchet wheels 3 and having each of its opposite ends provided with a web 5 through which the axle 1 is loosely directed. One of the flanges or beams 5 overlies the axle 1 and while the second flange thereof is arranged in advance of said axle. Suitably secured to the second or depending flange of the beam 4 is a forwardly directed elongated member or beam 6 having operatively connected with its forward or outer end portion the truck T of any desired type. The truck T is herein disclosed as provided with thills 7 so that a single draft animal may be employed. It is to be understood, however, that any desired draft rigging may be employed, as under certain conditions it may be desired to employ more than one draft animal.

Suitably mounted upon the beam 6 is a seat structure S and it is to be noted that the structure S is so positioned as to prevent the occupant thereof being injured by an unruly draft animal. It is also to be understood that by the use of a truck T the draft animal or animals are freed from the weight of the machine and which in practice has proven of decided advantage and importance.

F denotes a frame structure suitably supported by the beams 4 and 6 and which frame includes the rearwardly directed and substantially parallel arms 8. The rear portions of the arms 8 are provided with the upstanding bearings 9 which rotatably support the rake bar 10. Extending rearwardly from the bar 10 are the rake tines or teeth 11 of a conventional type and which, when in lowered position, serve to collect the hay or the like. As is particularly illustrated in Fig. 1, the bar 10 is of a length to extend outwardly of both of the wheels 2 with the extended portions also provided with the tines or teeth 11. By this arrangement, it will be at once self-evident that the rake may be employed with convenience and facility to collect hay or the like which may be laying immediately adjacent a fence, irrigating ditch or the like.

The rear portions of the arms 8 have secured thereto the transverse bar 12 coextensive with the length of the bar 10. Extending rearwardly from the bar 12 and disposed through the teeth or tines 11 are the cleaning fingers 14 whereby the dumping of the hay or the like collected by the tines or fingers 11 is materially facilitated upon raising of such tines or teeth.

Carried by the beam 4 are the upstanding brackets 15 which are herein disclosed as four in number and which extend partially to the rear of the beam 4. The upper portion of each of the brackets 15 is provided with an arcuate slot 16 concentric to the axle 1. Loosely disposed through the slots 16 of the brackets 15 is a rock shaft 17. Substantially midway thereof, the shaft 17 has an upstanding rock arm 18 to the upper end portion of which is pivotally engaged a lever 19. The lever 19 is also pivotally engaged with an upstanding rock arm 20 carried by the bar 10. The opposite end portions of the shaft 17 are provided with the forwardly directed arms 21, overlying the ratchet wheels 3. The outer or free extremity of each of the arms 21 is provided with a depending lug 22 engageable with the teeth of the adjacent ratchet wheel 3. As is particularly disclosed in Fig. 3, the teeth of the ratchet wheel 3 are so arranged that when the lugs 22 of the arms 21 are engaged with the ratchet wheels 3, the shaft 17 will be moved forwardly of the slots 16 and which movement results in rocking the bar 10 in a direction to raise or elevate the tines or teeth 11 in order to effect a dumping of the load by said tines or teeth 11 and which dumping operation is further facilitated by the cleaning fingers 14.

When the teeth or tines 11 are in their lowered or working position the shaft 17 rests in the rear or lower end portion of the slot 16 and when the shaft 17 is in this particular position the lugs 22 of the arms 21 are free of the ratchet wheels 3.

Overlying the forward peripheral portion of each of the ratchet wheels 3 is a cam or shoe 23 supported in a desired position by the bracket 24 secured to the depending or forward flange of the beam 4. The shoe or cam 23 is so positioned as to engage the outer end portion of the adjacent arm 21 and disengage the lug 22 thereof from the ratchet wheel 3 after the shaft 17 has been drawn along the slot 16 an extent sufficient to raise or elevate the tines or teeth 11 to complete a dumping operation and so that the device may be advanced with the teeth or tines raised or elevated without strain or pull being imposed upon the bar 10. After the tines or teeth have been fully raised they will be retained in such position through the medium of the retractile member 25, herein disclosed as a coil spring, having one end portion secured to the rock arm 18 at a point above the shaft 17 and its opposite end portion anchored to the beam 6 at a point in advance of the beam 4. The retractile member 25 serves to maintain the tines or teeth 11 elevated until the same are forced downwardly into working position in a manner to be hereinafter more particularly referred to.

When it is desired to effect a dumping operation an inward rotary movement is imparted manually to the shaft 17 in order to engage the lugs or teeth 22 with the ratchet wheels 3. As herein disclosed this initial rotation is accomplished through the medium of a second upstanding rock arm 26 carried by the shaft 17 and which arm 26 has pivotally engaged with its upper portion the rigid link 27. The link 27 is also pivotally engaged with the lower portion of the lever 28 pivotally supported at substantially midway its length by the beam 6 for swinging movement in a vertical plane. The upper portion of the lever 28 is provided with a pedal 29 having an upstanding loop 30 through which the foot of the operator is adapted to be disposed. Upon the operator or occupant of the seat structure S pulling upwardly with his foot engaged with the loop 30, forward movement will be imparted to the link 27 and which movement results in the desired initial rotation of the shaft 17 to cause the lugs or teeth 22 of the arms 21 to properly engage the ratchet wheel 3.

The bar 10 is provided with a second upstanding rock arm 31 to the upper end portion of which is pivotally engaged an elongated rigid member or link 32 which extends beneath the axle 1 and has its forward end portion pivotally connected with the lower end portion of the lever 33 mounted intermediate its length upon the beam 6 for swinging movement in a vertical plane. The upper portion of the lever 33 is provided with a pedal 34. Upon depressing the pedal 34 rearward movement will be imparted to the member or link 32 and which throws the tines or teeth 11 downwardly into working position. By imposing pressure upon the pedal 34 the operator can hold the tines or teeth 11 in proper contact with the surface over which the device is traveling.

35 denotes a foot rest carried by the beam 6 in advance of the levers 28 and 33 and which is engaged by the feet of the operator or occupant of the seat structure S when the feet are not engaged with said links.

From the foregoing description, it is thought to be obvious that a rake constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A device of the character described comprising a portable frame, a rake bar rotatably supported thereby, tines extending from the bar, a rock shaft supported by the body and mounted for limited lateral movement, a rock arm carried by the shaft and operatively engaged with the rake bar, a driven member carried by the body, means carried by the rock shaft and engageable with the driven member whereby said driven member imparts lateral movement to the rock shaft in a direction to elevate the tines, automatic means for disengaging the first named means from the driven member, and a retractile member engaged with the rock arm for maintaining the tines elevated after the first named means has been disengaged from the driven member.

2. A device of the character described comprising a portable frame, a rake bar rotatably supported thereby, tines extending from the bar, a rock shaft supported by the body and mounted for limited lateral movement, a rock arm carried by the shaft and operatively engaged with the rake bar, a driven member carried by the body, means carried by the rock shaft and engageable with the driven member whereby said driven member imparts lateral movement to the rock shaft in a direction to elevate the tines, automatic means for disengaging the first named means from the driven member, a retractile member engaged with the rock arm for maintaining the tines elevated after the first named means has been disengaged from the driven member, and means operatively engaged with the rake bar for lowering the tines.

3. A device of the character described comprising a wheel supported axle, a beam carried by the axle and disposed longitudinally thereof, a forwardly directed beam secured to the first named beam, a truck supporting the outer end portion of the second named beam, a substantially U-shaped shaft frame secured to both of the beams and having its free ends rearwardly directed, a rake bar rotatably supported by the free end portions of the frame, tines extending rearwardly from the rake bar, a transverse bar secured to the free extremities of the frame rearwardly of the rake bar, said transverse bar being of a length coextensive with the length of the rake bar, fingers carried by the transverse bar and extending between the tines of the rake bar, and means for rocking the rake bar to elevate the tines.

In testimony whereof I hereunto affix my signature in the presence of two witnesses.

HARRY F. LANFERMAN.

Witnesses:
HENRY DAUGHTY,
RUBE SPANGLER.

Copies of this patent may be obtained for five cents each, by addressing the "Commissioner of Patents, Washington, D. C."